US006736879B2

(12) United States Patent
Hasenberg et al.

(10) Patent No.: US 6,736,879 B2
(45) Date of Patent: May 18, 2004

(54) PROCESS TO PREPARE LOW CARBON DISULFIDE CONTAINING DIMETHYL SULFIDE

(75) Inventors: Dan M. Hasenberg, Bartlesville, OK (US); Stan A. Zisman, Bartlesville, OK (US); Mitchell D. Refvik, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 10/136,244

(22) Filed: May 1, 2002

(65) Prior Publication Data

US 2003/0205134 A1 Nov. 6, 2003

(51) Int. Cl.[7] .................. B01D 53/04; B01D 53/48; B01D 53/62
(52) U.S. Cl. .............. 95/118; 95/121; 95/135; 95/136; 95/139
(58) Field of Search .............. 95/117, 118, 121, 95/135, 136, 139; 210/660, 681

(56) References Cited

U.S. PATENT DOCUMENTS

| 2,671,722 | A | * | 3/1954 | Sweetser et al. ............... 48/206 |
| 4,009,009 | A | * | 2/1977 | Massoth et al. ............... 95/135 |
| 4,329,160 | A | * | 5/1982 | Sherman et al. ............... 95/136 |
| 4,358,297 | A | * | 11/1982 | Eberly, Jr. .................... 95/136 |
| 4,493,715 | A | * | 1/1985 | Hogan et al. .................. 95/139 |
| 4,663,052 | A | * | 5/1987 | Sherman et al. ............. 210/679 |
| 4,835,338 | A | * | 5/1989 | Liu .............................. 585/823 |
| 4,861,566 | A | * | 8/1989 | Denny ......................... 423/230 |
| 5,109,713 | A | * | 5/1992 | Romero et al. ........... 73/864.83 |
| 5,146,042 | A | | 9/1992 | Gurak et al. |
| 5,157,201 | A | | 10/1992 | Norris |
| 5,177,050 | A | * | 1/1993 | Schubert ..................... 502/415 |
| 5,185,485 | A | | 2/1993 | Dyroff et al. |
| 5,264,114 | A | | 11/1993 | Dunbar |
| 5,300,718 | A | | 4/1994 | McCaulley |
| 5,302,771 | A | | 4/1994 | Venkatram et al. |
| 5,393,856 | A | | 2/1995 | Kulzick et al. |
| 5,744,555 | A | | 4/1998 | Ames et al. |
| 5,856,265 | A | | 1/1999 | Kanazirev |
| 5,925,158 | A | | 7/1999 | Weber et al. |
| 5,948,726 | A | | 9/1999 | Moskovitz et al. |
| 5,955,393 | A | | 9/1999 | Moskovitz et al. |
| 5,985,790 | A | | 11/1999 | Moskovitz et al. |
| 6,013,600 | A | | 1/2000 | Kanazirev |
| 6,099,619 | A | * | 8/2000 | Lansbarkis et al. ........... 95/118 |
| 6,113,869 | A | | 9/2000 | Jain et al. |
| 6,124,410 | A | | 9/2000 | Ito et al. |
| 6,159,898 | A | | 12/2000 | Kanazirev |
| 6,168,769 | B1 | | 1/2001 | Zisman et al. |
| 6,287,365 | B1 | * | 9/2001 | Markovs et al. ............... 95/96 |
| 6,338,830 | B1 | | 1/2002 | Moskovitz et al. |
| 6,342,191 | B1 | | 1/2002 | Kepner et al. |
| 6,355,094 | B1 | * | 3/2002 | Schomaker et al. ........... 95/92 |
| 6,475,265 | B1 | * | 11/2002 | Baksh et al. .................... 95/96 |
| 6,511,528 | B1 | * | 1/2003 | Lansbarkis et al. ........... 95/118 |
| 2002/0018853 | A1 | * | 2/2002 | Khare ......................... 427/387 |
| 2002/0060170 | A1 | * | 5/2002 | Pidgeon ...................... 208/303 |
| 2002/0084223 | A1 | * | 7/2002 | Feimer et al. ............... 210/660 |

OTHER PUBLICATIONS

David L. Smith, Olefin and Comonomer Purification via Selective Adsorption to Assure Metallocene Catalyst Activity, May 1993, San Ramon, CA.

Alcoa Industrial Chemicals Div., Selexsorb COS, Chemicals Product Data, May 1992.

* cited by examiner

Primary Examiner—Robert H. Spitzer
(74) Attorney, Agent, or Firm—Jenkens & Gilchrist

(57) ABSTRACT

An adsorption method is disclosed for removal of acid gas from a sulfur compound stream. The method relates to a novel process to remove acid gas from a sulfur compound stream by adsorption on an adsorption media adsorbent followed by regeneration of the adsorption media after the adsorption capacity has been reached. The adsorption media comprises an activated alumina, which has been previously treated with one or more alkali metal compounds, one or more alkaline earth metal compounds, or a mixture thereof; and then regenerating the adsorbent after the adsorption capacity has been reached.

36 Claims, No Drawings

PROCESS TO PREPARE LOW CARBON DISULFIDE CONTAINING DIMETHYL SULFIDE

FIELD OF THE INVENTION

This invention relates to a novel process to remove a portion of acid gas from a sulfur compound stream to produce a low acid gas sulfur product. More specifically, this invention relates to a novel process to remove a portion of acid gas from the sulfur compound stream by adsorption on an adsorption media followed by regeneration of the adsorption media when the adsorption capacity has been reached.

BACKGROUND OF THE INVENTION

Generally, when a sulfur compound stream such as dimethylsulfide (DMS) or methyl mercaptan, is produced, it can contain carbon disulfide ($CS_2$) in the range of 0 to about 0.5 wt %. Various methods for removing $CS_2$ from DMS and mercaptans are known in the art. Treatment with aqueous caustic for $CS_2$ removal is a possible route for producing a low $CS_2$ DMS. In this process, aqueous caustic is added to the sulfur compound stream in a tank to form a mixture. The mixture is circulated through a roll pump. Subsequently, the mixing is stopped and two phases, an aqueous phase and a an organic phase are formed. The two phases are allowed to separate, and the aqueous phase is drained off the bottom of the tank.

However in this process, it is necessary to add a phase transfer agent such as methanol or trimethyl amine, in order to provide adequate contact between the aqueous phase and the organic phase. Subsequent draining of the aqueous caustic can cause a high total organic carbon (TOC) count at plant wastewater systems if this route is employed. There is a need for an efficient, environmental-friendly process to remove acid gas from a sulfur compound stream.

Alternatively, the acid gas can be removed via distillation. However, $CS_2$ and DMS form an azeotrope that limits the ultimate purity of DMS that can be obtained via distillation.

Other markets for high purity DMS (low $CS_2$) may become available in the future. Dimethyl sulfoxide (DMSO), which is produced via partial oxidation of high purity DMS, is one possibility. Another market opportunity is low $CS_2$ DMS for ethylene furnace treatment. High $CS_2$ content in the DMS for treatment of the cracking furnace tubes can result in off specification $C_5+$ streams which in turn cause a number of unfavorable consequences in downstream processes. The inventors provide such a process in this patent application.

A novel method to remove acid gas from a sulfur compound stream is disclosed. The acid gas consists of at least one compound selected from the group consisting of carbon disulfide ($CS_2$), carbonyl sulfide (COS), carbon dioxide ($CO_2$), or hydrogen sulfide ($H_2S$). The sulfur compound stream is selected from a group consisting of sulfides, disulfides, or thiols (mercaptans). Preferably, the S compound stream is selected from one or more of the following: DMS, diethylsulfide (DES), dimethyldisulfide (DMDS), methyl ethyl sulfide (MES), methyl isopropyl sulfide, methyl mercaptan, or ethyl mercaptan. Specifically, the method relates to a novel process to remove $CS_2$ from a sulfur containing stream by adsorption on an adsorption media comprising an activated alumina adsorbent followed by regeneration of the activated alumina after adsorption capacity has been reached. The adsorption media comprises an activated alumina, which has been previously treated with one or more alkali metal compounds, one or more alkaline earth metal compounds, or a mixture thereof; then regenerating the adsorbent after the adsorption capacity has been reached. Specifically, the adsorption media comprises an activated alumina, which has been previously treated with caustic; then regenerating the adsorbent after the adsorption capacity has been reached. Preferably, the caustic used in the treatment of the activated alumina is sodium hydroxide (NaOH). The activated alumina will adsorb acid gases ($CO_2$, COS, $H_2S$ and $CS_2$) from liquid hydrocarbon streams. The process to adsorb acid gas with activated alumina from a liquid hydrocarbon stream is disclosed in U.S. Pat. Nos. 4,835,338 and 4,493,715 herein incorporated by reference. However, using the alumina impregnated with caustic or other adsorbent medias to remove acid gas from a sulfur containing stream would not be readily apparent by one skilled in the art. One skilled in the art may believe that cleaving of sulfur compounds in the sulfur compound stream could occur thus making the ability of the adsorbent to remove acid gas ineffective. However, a new use and a process have been developed to use activated alumina to remove acid gas from the sulfur compound stream.

SUMMARY OF THE INVENTION

An object of this invention is to remove a portion of acid gas from a sulfur compound stream to produce a low acid gas sulfur product.

Another object of this invention is to remove a portion of the acid gas from a wet sulfur compound stream to produce a low acid gas sulfur product.

Another object of this invention is to provide a process for the removal of a portion of $CS_2$ from a sulfur compound stream by adsorption on an adsorption media comprising an activated alumina adsorbent followed by regeneration of the activated alumina after the adsorption capacity has been reached.

Another object of this invention is to provide an improved process for removal of a portion of $CS_2$ from a sulfur compound stream by adsorption on a an adsorption media comprising an activated alumina which has been previously treated with one or more alkali metal compounds, alkaline earth metal compounds, or a mixture thereof, and then regenerating the adsorbent after the adsorption capacity has been reached.

Another object of this invention is to provide an improved process for removal of a portion of $CS_2$ from a sulfur compound stream by adsorption on a adsorption media comprising an activated alumina which has been previously treated with caustic.

Another object of this invention is to provide a process to remove $CS_2$ from a DMS stream by adsorption on a an adsorption media comprising adsorbing said $CS_2$ in an adsorption zone to remove a portion of said $CS_2$ from said DMS stream to produce a low $CS_2$ DMS product wherein said adsorption zone comprises an adsorber containing activated alumina adsorbent; wherein said activated alumina has been previously treated with one or more alkali metal compounds, one or more alkaline earth metal compounds, or a mixture thereof.

Another object of this invention is to provide a process to remove $CS_2$ from a DMS stream by adsorption on a an adsorption media comprising adsorbing said $CS_2$ in an adsorption zone to remove a portion of said $CS_2$ from said DMS stream to produce a low $CS_2$ DMS product wherein said adsorption zone comprises an adsorber containing activated alumina adsorbent; wherein said activated alumina has been treated with caustic.

Another object of this invention is to provide a process to remove $CS_2$ from a DMS stream by adsorption on a an adsorption media comprising adsorbing said $CS_2$ in an adsorption zone to remove a portion of said $CS_2$ from said DMS to produce a low $CS_2$ DMS product wherein said adsorption zone comprises an adsorber containing activated alumina adsorbent; wherein said activated alumina has been previously treated with one or more alkali metal compounds, one or more alkaline earth metal compounds, or a mixture thereof, wherein said adsorber is operated at a temperature in a range of −25° C. to about 100° C.; wherein said adsorber is operated to its adsorption capacity and regenerated with nitrogen or natural gas at a temperature in a range of 235° C. to 300° C.

Another object of this invention is to provide a process to remove $CS_2$ from a DMS stream by adsorption on a an adsorption media comprising adsorbing said $CS_2$ in an adsorption zone to remove a portion of said $CS_2$ from said DMS to produce a low $CS_2$ DMS product wherein said adsorption zone comprises an adsorber containing activated alumina adsorbent; wherein said activated alumina has been treated with caustic; wherein said adsorber is operated at a temperature in a range of −25° C. to about 100° C.; wherein said adsorber is operated to its adsorption capacity and regenerated with nitrogen or natural gas at a temperature in a range of 235° C. to 300° C. In accordance with one embodiment of this invention, a process to remove acid gas from a sulfur containing stream, said process comprising (or optionally, "consisting essentially of" or "consisting of") the following step:

adsorbing said acid gas in an adsorption zone to remove a portion of said acid gas from said sulfur compound stream to produce a low acid gas sulfur product.

In accordance with another embodiment of this invention, a process to remove acid gas from a sulfur containing stream, said process comprising (or optionally, "consisting essentially of" or "consisting of") the following step:

adsorbing said $CS_2$ in an adsorption zone to remove a portion of $CS_2$ from said sulfur compound stream to produce a low $CS_2$ sulfur product.

In accordance with another embodiment of this invention, a process to remove acid gas from a sulfur containing stream, said process comprising (or optionally, "consisting essentially of" or "consisting of") the following step:

adsorbing said $CS_2$ in an adsorption zone to remove a portion of said $CS_2$ from said DMS to produce a low $CS_2$ DMS product wherein said adsorption zone comprises an adsorber containing activated alumina adsorbent; wherein said activated alumina has been previously treated with one or more alkali metal compounds, one or more alkaline earth metal compounds, or a mixture thereof.

In accordance with another embodiment of this invention, a process to remove acid gas from a sulfur containing stream, said process comprising (or optionally, "consisting essentially of" or "consisting of") the following step:

adsorbing said $CS_2$ in an adsorption zone to remove a portion of said $CS_2$ from said DMS to produce a low $CS_2$ DMS product wherein said adsorption zone comprises an adsorber containing activated alumina adsorbent; wherein said activated alumina has been treated with caustic.

In accordance with another embodiment of this invention, a process to remove acid gases from a sulfur containing stream, said process comprising (or optionally, "consisting essentially of" or "consisting of") the following step:

adsorbing said $CS_2$ in an adsorption zone to remove a portion of said $CS_2$ from said DMS to produce a low $CS_2$ DMS product wherein said adsorption zone comprises an adsorber containing activated alumina adsorbent; wherein said activated alumina has been previously treated with one or more alkali metal compounds, one or more alkaline earth metal compounds, or a mixture thereof; wherein said adsorber is operated at a temperature in a range of −25° C. to about 100° C.; wherein said adsorber is operated to its adsorption capacity and regenerated with nitrogen or natural gas at a temperature in a range of 235° C. to 300° C.

In accordance with another embodiment of this invention, a process to remove acid gases from a sulfur containing stream, said process comprising (or optionally, "consisting essentially of" or "consisting of") the following step:

adsorbing said $CS_2$ in an adsorption zone to remove a portion of said $CS_2$ from said DMS to produce a low $CS_2$ DMS product wherein said adsorption zone comprises an adsorber containing activated alumina adsorbent; wherein said activated alumina has been treated with caustic; wherein said adsorber is operated at a temperature in a range of −25° C. to about 100° C.; wherein said adsorber is operated to its adsorption capacity and regenerated with nitrogen or natural gas at a temperature in a range of 235° C. to 300° C.

These objects, and other objects, will become more apparent to others with ordinary skill in the art after reading this disclosure.

DETAILED DESCRIPTION OF THE INVENTION

In a first embodiment of this invention, a process to remove carbon disulfide from a sulfur containing stream is provided. The process comprises the following steps:

Step (1) is adsorbing said acid gas in an adsorption zone to remove a portion of the acid gas from the sulfur compound stream to produce a low acid gas sulfur product.

The acid gas is at least one compound selected from the group consisting of hydrogen sulfide ($H_2S$), carbon dioxide ($CO_2$), carbonyl sulfide (COS), and carbon disulfide ($CS_2$). Preferably the acid gas is $CS_2$.

The sulfur containing stream is at least one selected from a group consisting of sulfides, disulfides, and thiols (mercaptans) or mixtures thereof. Preferably, the sulfur containing stream is at least one selected from the group consisting of DMS, DMDS, MES, methyl isopropyl sulfide, methyl mercaptan, and ethyl mercaptan. The mercaptan compounds have a chemical formula of R—S—H, wherein R is a hydrocarbon radical having 1 to 12 carbons. Generally, the acid gas in the sulfur compound stream is less than about 5 wt %. Preferably, the acid gas in the sulfur compound stream is less than 1 wt %. Most preferably, the acid gas in the sulfur compound stream is less than 2000 ppmw. The amount of $CS_2$ in the sulfur compound stream is less than about 5 wt %. Preferably, the $CS_2$ is less than 1 wt %. Most preferably, the $CS_2$ in the sulfur compound stream is less than 2000 ppmw.

Acid gas is adsorbed from the sulfur compound stream in an adsorption zone. The adsorbing can be conducted in the adsorption zone by any means known in the art. Preferably the adsorption zone comprises an adsorber having an adsorption media. The adsorption media is selected from a group consisting of activated alumina, silicas, zinc oxides or alkali metal compounds. Generally, the activated alumina comprises an activated alumina, which has been previously treated with one or more alkali metal compounds, one or more alkaline earth metal compounds, or a mixture thereof. Specifically, the activated alumina can be previously impregnated with a caustic compound such as, for example sodium hydroxide. The silicas are comprised of, silicon, oxygen and at least one metal.

The pressure in the adsorber is in the range of 0 psig to about 1000 psig. Preferably, the pressure is in a range of 10 psig to 200 psig. Most preferably, the pressure is in a range of 25 psig to 60 psig. The temperature in the adsorber is in a range of about −25° C. to about 100° C. Preferably, the temperature is in a range of 0° C. to about 50° C. Most preferably, the temperature is in a range of 10° C. to 25° C.

The acid as in the low acid gas sulfur product is less than about 2.5 wt %. Preferably, the acid gas in the low gas sulfur product is less than about 1wt %. Most preferably, the acid gas in the low acid gas sulfur product is less than 500 ppmw. When removing $CS_2$ from a sulfur compound stream, the amount of $CS_2$ in the in low acid gas sulfur product is less than about 2.5 wt %. Preferably, the $CS_2$ in the low gas sulfur product is less than about 1 wt %. More preferably, the $CS_2$ in the low acid gas sulfur product is less than 500 ppmw.

When removing $CS_2$ from a DMS stream to form low $CS_2$ DMS, the amount of $CS_2$ in the low $CS_2$ DMS is less than about 2.5 wt %. Preferably, the $CS_2$ in the low $CS_2$ DMS is less than 1 wt %. Most preferably, the $CS_2$ in the low DMS product is less than 500 ppmw.

Step (2) is optionally drying the wet sulfur containing stream in a drying zone to produce the sulfur containing stream. The water content of the sulfur containing stream is sufficiently dry to prevent downstream operational problems. Generally, the water content is in the range of less than 2500 ppmw. Preferably, the water content of the sulfur containing stream is less than 100 ppmw. Most preferably, the water content of the sulfur containing stream is less than 10 ppmw. Drying in the drying zone can be accomplished by any means known in the art. For example, molecular sieve beds can be utilized to remove water. Preferably, molecular sieve beds are Type 3A.

Step (3) is optionally regenerating the adsorbent media in the adsorption zone when adsorption capacity of the adsorbent media has been reached.

The regeneration process comprises passing a regeneration gas through the adsorbent media to produce an acid gas rich stream. A regeneration gas can be any gas known in the art to remove acid gas from the adsorbent media. Preferably, the regeneration gas is selected from the group consisting of natural gas and nitrogen. The composition of the regeneration gas has an acid gas concentration of less than about 0.5 vol %. Preferably, the composition of the regeneration gas has an acid gas concentration of less than about 0.1 vol %. Most preferably, the composition of the regeneration gas has acid gas concentration of less than about 0.05 vol %.

Generally, the temperature of the regeneration gas is in a range of about 220° C. to about 350° C. Preferably, the temperature of the regeneration gas is in a range of about 245° C. to about 275° C. Most preferably, the temperature of the regeneration gas is in a range of 245° C. to 255° C.

The pressure of the regeneration gas is in a range of 0 psig to about 1000 psig. Preferably, the regeneration gas pressure is in a range of about 5 psig to about 50 psig. Most preferably, the pressure is in the range of 5 psig to 20 psig.

EXAMPLES

The following examples are provided to assist a person skilled in the art with further illustrations of this invention. These examples are intended to be illustrative of the invention but are not meant to be construed as limiting the reasonable scope of the invention.

Example #1

A DMS stream containing 0.2678 wt % $CS_2$ was treated in a lab adsorber containing 500 ml of Selexsorb® COS at a pressure in the range of 13 psig to 26 psig and at a temperature in the range of 19° C. to 21° C. Selexsorb® COS is a commercially available 0.3 wt % caustic on alumina adsorbent. The DMS stream was charged to the adsorber at a rate of 0.6 cc/min and recycled to a feed tank. After 4 hours and 25 minutes, the amount of $CS_2$ in the DMS stream was 0.0450 wt %. After 7 hours and 10 minutes, the amount of $CS_2$ in the DMS stream was 0.0329 wt %. This concentration change represents an 85% reduction in $CS_2$ after 4 hours and 25 minutes of operation.

Example #2

A DMS stream containing 0.2678 wt % $CS_2$ was treated in a lab adsorber containing 500 ml of Selexsorb® COS at a pressure in the range of 13 psig to 16 psig and at a temperature in the range of 20° C. to 21° C. The DMS stream was charged to the adsorber at a rate of 0.6 cc/min and recycled to a feed tank. After 3 hours, the amount of $CS_2$ in the DMS stream was 0.0882 wt %. After 5 hours and 35 minutes, the amount of $CS_2$ in the DMS stream was 0.0448 wt %. This change in concentration represents an 83% reduction in $CS_2$ after 5 hours and 35 minutes of operation.

Example #3

A DMS stream containing 1.4605 wt % $CS_2$ was treated in a lab adsorber containing 500 ml of Selexsorb® COS at a pressure in the range of 6 psig to 10 psig and at a temperature of 20° C. The DMS stream was charged to the adsorber at a rate of 0.6 cc/min and recycled to a feed tank. After 8 hours, the amount of $CS_2$ in the DMS stream was 0.9851 wt %. After 12 hours and 45 minutes, the amount of $CS_2$ in the DMS stream was 0.8981 wt %. The adsorber was regenerated utilizing a nitrogen stream for 5 hours at a temperature in the range of 260° C. and 275° C. Then the DMS stream was charged again to the adsorber at a rate of 6 cc/minute. After 4 hours and 35 minutes, the amount of $CS_2$ in the DMS stream was 0.5387 wt %. This represents a 63% reduction in $CS_2$ after 4 hours and 35 minutes of operation.

Example #4

A DMS tank containing 0.158 wt % $CS_2$ in 7000 gallons of DMS was treated in a plant adsorber containing 2500 lbs of Selexsorb® COS at a pressure in the range of 20 psig to 30 psig and at a temperature in the range of 5° C. to 15° C. The DMS stream (from the tank) was charged to the adsorber at a rate of 30 gallons/minute. The DMS stream was continuously recycled back to a feed tank. After 8 days and 21 hours, the amount of $CS_2$ in the low $CS_2$ DMS product was 0.089 wt %. The adsorber was then regenerated by utilizing a natural gas stream (containing 0.09 vol % acid gases, (0.03 vol % $H_2S$ and 0.06 vol % $CO_2$) for 6 hours at 250° C. The process was repeated. After 17 days 6 hours, the amount of $CS_2$ in the low $CS_2$ DMS product was 0.033 wt %. This change represents a 79% reduction in $CS_2$ after 17 days and 6 hours of operation.

That which is claimed is:

1. A process to remove acid gas from a sulfur compound stream, said process comprises adsorbing said acid gas in an adsorption zone having adsorption means to remove a portion of said acid gas from said sulfur compound stream to produce a low acid gas sulfur product.

2. A process according to claim 1 wherein a wet sulfur compound stream comprising water is dried in a drying zone to remove a portion of said water from said wet sulfur compound stream to produce said sulfur compound stream.

3. A process according to claim 1 wherein said sulfur compound stream is selected from the group consisting of sulfides, disulfides, and mercaptans.

4. A process according to claim 3 wherein said mercaptan compounds have a chemical formula of R—S—H, wherein R is a hydrocarbon radical having 1 to 12 carbon atoms.

5. A process according to claim 3 wherein said sulfur compound stream is selected from the group consisting of dimethylsulfide and methyl mercaptan.

6. A process according to claim 1 wherein said sulfur compound stream is selected from the group consisting of dimethylsulfide, diethylsulfide, dimethyldisulfide, methyl ethyl sulfide, methyl isopropyl sulfide, methyl mercaptan, and ethyl mercaptan.

7. A process according to claim 1 wherein said adsorption zone is regenerated with a hot gas to produce an acid gas rich stream.

8. A process according to claim 7 wherein said adsorption zone is regenerated at a regeneration temperature from about 200° C. to about 300° C.

9. A process according to claim 7 wherein said adsorption zone is regenerated when the adsorption capacity of said adsorption zone has been reached.

10. A process according to claim 1 wherein said acid gas is at least one compound selected from the group consisting of $H_2S$, $CO_2$, COS, and $CS_2$.

11. A process according to claim 1 wherein said acid gas is $CS_2$.

12. A process according to claim 1 wherein said low acid gas sulfur product has an acid gas concentration of less than 10 ppmw.

13. A process according to claim 1 wherein said adsorption zone means comprises an activated alumina absorbent.

14. A process according to claim 13 wherein said activated alumina absorbent has been previously treated with one or more alkali metal compounds, one or more alkaline earth metal compounds, or a mixture thereof.

15. A process according to claim 13 wherein said activated alumina has been previously treated with caustic.

16. A process according to claim 1 wherein said adsorption means comprises silica adsorbents.

17. A process according to claim 1 wherein said adsorption means comprises zinc oxides adsorbents.

18. A process to remove $CS_2$ from a sulfur compound stream, said process comprising adsorbing said $CS_2$ in an adsorption zone having adsorption means to remove a portion of $CS_2$ from said sulfur compound stream to produce a low $CS_2$ sulfur product.

19. A process according to claim 18 wherein a wet sulfur compound stream comprising water is dried in a drying zone to remove a portion of said water from said wet sulfur compound stream to produce said sulfur compound stream.

20. A process according to claim 18 wherein said sulfur compound stream is selected from the group consisting of sulfides, disulfides, or thiols (mercaptans).

21. A process according to claim 20 wherein said mercaptan compounds have a chemical formula R—S—H, wherein R is a hydrocarbon radical having 1 to 12 carbon atoms.

22. A process according to claim 20 wherein said sulfur compound stream is selected from the group consisting of dimethylsulfide and methyl mercaptan.

23. A process according to claim 18 wherein said sulfur compound stream is selected from the group consisting of DMS, DES, DMDS, MES, methyl isopropyl sulfide, methyl mercaptan, or ethyl mercaptan.

24. A process according to claim 18 wherein said adsorption zone is regenerated with a regeneration gas to produce a $CS_2$ rich stream wherein said regeneration gas is selected from the group consisting of nitrogen and natural gas.

25. A process according to claim 24 wherein said natural gas has an acid gas content of up to 0.5 wt %.

26. A process according to claim 24 wherein said adsorption zone is regenerated at a regeneration temperature from about 200° C. to about 300° C.

27. A process according to claim 24 wherein said adsorption zone is regenerated when the adsorption capacity of said adsoption zone has been reached.

28. A process according to claim 18 wherein said low $CS_2$ sulfur product has a $CS_2$ concentration of less than 0.25 wt %.

29. A process according to claim 18 wherein said adsorption zone means comprises an activated alumina adsorbent.

30. A process according to claim 29 wherein said activated alumina has been previously treated with one or more alkali metal compounds, one or more alkaline earth metal compounds) or a mixture thereof.

31. A process according to claim 30 wherein said adsorption zone is regenerated when the adsorption capacity of said adsorption zone has been reached.

32. A process according to claim 29 wherein said activated alumina adsorbent has been previously treated with caustic.

33. A process according to claim 18 wherein said adsorption means comprises silica adsorbents.

34. A process according to claim 18 wherein said adsorption means comprises zinc oxides adsorbents.

35. A process to remove $CS_2$ from a dimethylsulfide stream, said process comprising adsorbing said $CS_2$ in an adsorption zone to remove a portion of said $CS_2$ from said dimethylsulfide to produce a low $CS_2$ dimethylsulfide product wherein said adsorption zone comprises an adsorber containing activated alumina adsorbent; wherein said activated alumina has been previously treated with one or more alkali metal compounds, one or more alkaline earth metal compounds, or a mixture thereof.

36. A process to remove $CS_2$ from a dimethylsulfide stream, said process comprising adsorbing said $CS_2$ in an adsorption zone to remove a portion of said $CS_2$ from said dimethylsulfide stream to produce a low $CS_2$ dimethylsulfide product wherein said adsorption zone comprises an adsorber containing activated alumina adsorbent; wherein said activated alumina has been previously treated with one or more alkali metal compounds, one or more alkaline earth metal compounds, or a mixture thereof; wherein said adsorber is operated at a temperature in a range of −25° C. and 100° C.; wherein said adsorber is operated to its adsorption capacity and regenerated with nitrogen or natural gas at a temperature in a range of 235° C. to 300° C.

* * * * *